US009121589B2

(12) United States Patent
Melzner

(10) Patent No.: US 9,121,589 B2
(45) Date of Patent: Sep. 1, 2015

(54) PROJECTOR

(75) Inventor: Erwin Melzner, Frasdorf (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 1053 days.

(21) Appl. No.: 11/922,712

(22) PCT Filed: Jun. 14, 2006

(86) PCT No.: PCT/EP2006/005950
§ 371 (c)(1),
(2), (4) Date: Feb. 4, 2008

(87) PCT Pub. No.: WO2006/136387
PCT Pub. Date: Dec. 28, 2006

(65) Prior Publication Data
US 2009/0027890 A1    Jan. 29, 2009

(30) Foreign Application Priority Data
Jun. 22, 2005 (DE) .......................... 10 2005 029 671

(51) Int. Cl.
*F21V 29/505* (2015.01)
*F21V 29/00* (2015.01)
*F21V 29/76* (2015.01)
(Continued)

(52) U.S. Cl.
CPC .............. *F21V 29/004* (2013.01); *F21V 29/505* (2015.01); *F21V 29/763* (2015.01); *F21V 29/83* (2015.01); *F21W 2131/406* (2013.01)

(58) Field of Classification Search
CPC ..... F21V 29/004; F21V 29/83; F21V 29/505; F21V 29/763

USPC ........... 353/52, 53, 54, 55, 56, 57, 58, 59, 60, 353/61; 362/294, 296.01, 296.05, 297, 341, 362/344, 345, 346, 347, 348, 349
See application file for complete search history.

(56) References Cited

U.S. PATENT DOCUMENTS 1,758,290 A    5/1930    McCormack
4,945,454 A *  7/1990    Bunse et al. .................. 362/518
(Continued)

FOREIGN PATENT DOCUMENTS

DE    101 25 189 A1    10/2002
EP    0 389 659 A1     10/1989
(Continued)

OTHER PUBLICATIONS

English Translation of Office Action dated Jan. 18, 2011 for Application No. 2008-517405; 3 Pages.

*Primary Examiner* — Bao-Luan Le
(74) *Attorney, Agent, or Firm* — Christie, Parker & Hale, LLP

(57) ABSTRACT

A projector is provided. The projector comprising a projector housing in which there are arranged an illuminant holder, for holding an illuminant, a reflector that reflects the light beams emitted by the illuminant to a light exit opening of the projector housing that is covered by a transparent disk, and a convective cooling device, partially enclosing the illuminant, that produces a convection flow for dissipating the heat output by the illuminant and has a number of cooling fins combined into cooling fin packs. The cooling fins are aligned parallel to the radiating direction of the projector, and the cooling fin packs are arranged above and below the illuminant in the direction of gravity.

27 Claims, 8 Drawing Sheets

(51) Int. Cl.
*F21V 29/83* (2015.01)
*F21W 131/406* (2006.01)

(56) References Cited

U.S. PATENT DOCUMENTS

| | | | |
|---|---|---|---|
| 4,994,948 A * | 2/1991 | Cooch | 362/346 |
| 5,172,975 A | 12/1992 | Parker | |
| 5,515,254 A | 5/1996 | Smith et al. | |
| 5,558,155 A * | 9/1996 | Ito | 165/80.3 |
| 6,709,112 B2 * | 3/2004 | Miyamoto et al. | 353/57 |
| 2001/0030865 A1 * | 10/2001 | Glowach et al. | 362/294 |
| 2002/0136015 A1 | 9/2002 | Liang et al. | |
| 2003/0086271 A1 * | 5/2003 | Masuoka et al. | 362/345 |
| 2004/0037081 A1 * | 2/2004 | Blandford | 362/283 |
| 2004/0145896 A1 * | 7/2004 | Watanabe et al. | 362/294 |
| 2004/0240207 A1 * | 12/2004 | Takezawa et al. | 362/264 |
| 2004/0264197 A1 * | 12/2004 | Bewig et al. | 362/294 |
| 2005/0122724 A1 * | 6/2005 | Hirata et al. | 362/345 |
| 2006/0171150 A1 * | 8/2006 | Shimaoka | 362/304 |

FOREIGN PATENT DOCUMENTS

| | | |
|---|---|---|
| EP | 0 751 339 A2 | 1/1997 |
| JP | 2004-303448 | 10/2004 |
| WO | WO 2004/029507 A1 | 4/2004 |
| WO | WO 2005/095853 A1 | 10/2005 |

* cited by examiner

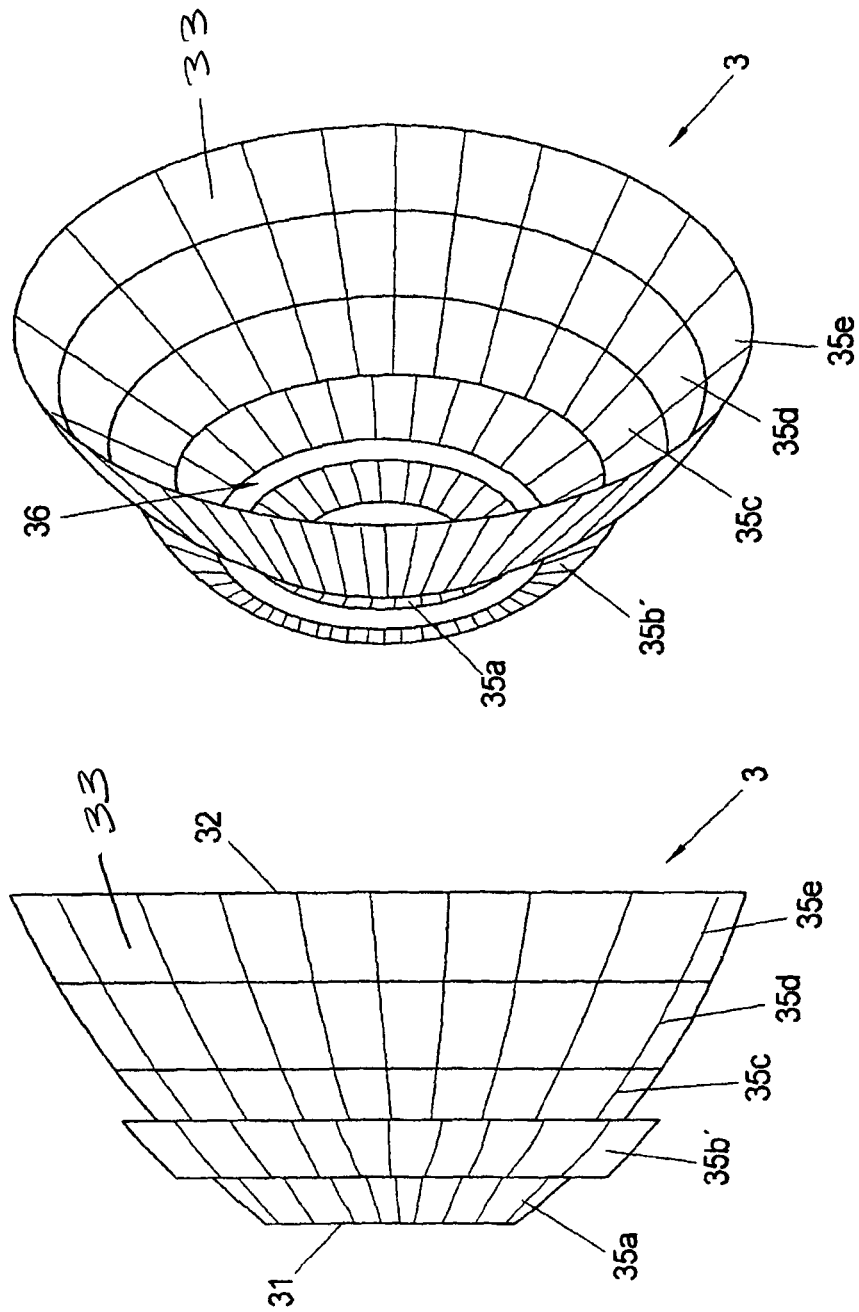

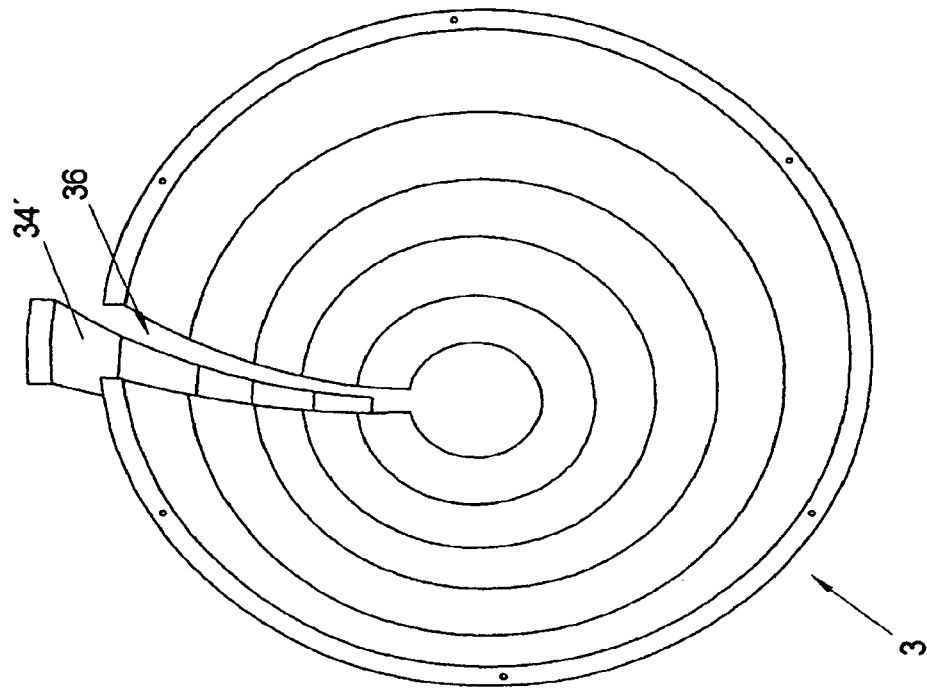
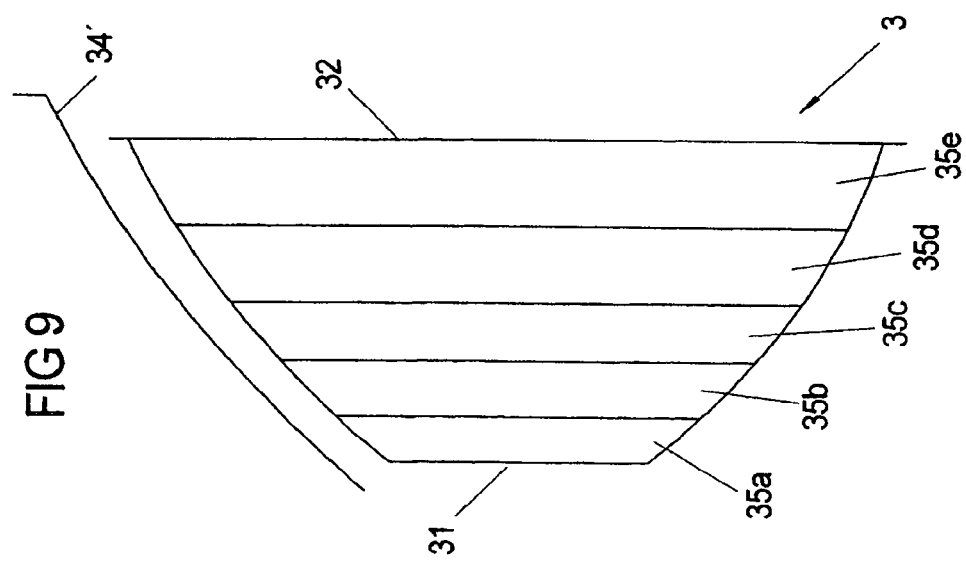

PROJECTOR

CROSS-REFERENCE TO A RELATED APPLICATION

This application is a National Phase Patent Application of International Patent Application Number PCT/EP2006/005950, filed on Jun. 14, 2006, which claims priority of German Patent Application Number 10 2005 029 671.8, filed on Jun. 22, 2005.

BACKGROUND

The invention relates to a projector.

WO 2004/029 507 A1 discloses a projector that has an illuminant that is arranged in a projector housing, is capped at one or two ends and comprises a lamp or a burner, for example a discharge lamp in the form of a metal-halide lamp, and a reflector that reflects the light emitted by the illuminant in the direction of a front opening of the projector housing that can be sealed by a transparent cover element, for example a protective disk or lens disk.

In addition to radiating visible light beams, a burning illuminant also produces in its arc or filament invisible thermal radiation that lies in the infrared spectral region and is output by the following three processes to the surroundings of the illuminant:

a) the thermal radiation is partially absorbed by the components surrounding the illuminant, such as reflector, illuminant base and supply leads to the illuminant, and by the projector housing, which components thereby experience negative influence on their material properties and themselves act as secondary heat source, b) thermal conduction takes place via the electric contacts and via the ceramic bodies of the illuminant base, and c) the ambient air of the illuminant is heated up, rises upward and entrains cooler air upward from below in a convective cooling process.

In order to support the last-named process and to provide a projector of high power with a compact design, the projector housing disclosed in WO 2004/029 507 A1 comprises an upper, cylindrical projector housing part and a lower projector housing part that is of cuboidal design and on which ventilation shafts with mutually separate ventilation ducts are arranged. The ventilation ducts are separated from one another by fins that have inside the ventilation shaft a first fin section adjacent to the air exit openings, and a second fin section, which is adjacent to the air exit openings and is bent away from the first fin section.

U.S. Pat. No. 5,172,975 A discloses a projector with an illuminant, a reflector and a light exit opening in a cylindrical projector housing on which there are formed ventilation ducts that likewise circulate for convective cooling of the surroundings of the illuminant outputting heat, and are delimited by fins. The fins are bent away outside the cylindrical projector housing and are flanged at their ends so that, firstly, light is prevented from exiting from the interior of the projector housing and, secondly, the flow of air is directed away perpendicularly from the projector housing.

U.S. Pat. No. 1,758,290 A discloses a projector housing with ventilation shafts, which are arranged on the housing walls, have ventilation ducts separated from one another and are separated from one another by fins such that uniform ventilation ducts are produced via which the cooling air flows into the interior of the projector housing. The ends, projecting into the interior of the projector housing, of the fins above and below the optical axis of the projector are bent away again in respectively opposite directions such that the ends of the fins arranged above the optical axis are directed toward the underside of the projector housing, while the ends, arranged below the optical axis, of the fins are directed toward the top side of the projector housing, and the two sections are connected to one another in a central horizontal part such that improved circulation of cooling air through the projector housing is attained by the different alignment of the ends, located in the interior of the projector housing, of the fins.

EP 0 389 659 A1 discloses a projector in the form of an emitter of compact design that has a lamp capped at one or two ends, a reflector part that comprises an annular frame bracket into which a parabolic reflector is inserted and on whose light exit side holders for a glass disk are arranged, a block-shaped housing for holding heat-sensitive electrical and electronic components, and a cooler that is arranged laterally on the reflector part at the level of the lamp. The cooler has a flange attachment that is aligned in the extent of the lamp axis and which is adjoined outside the reflector part by a cooling surface element that is designed as a cooling fin block, perforated plate arrangement, laminar arrangement or as a spigot configuration. The lamp holder is inserted in effectively thermally conducting contact into the flange attachment of the cooler, which attachment is designed as a tube flange, the cooler projecting with its flange attachment through an opening of the reflector into the reflector interior, while the cooling surface element projects across its entire width over the near side wall of the block-shaped housing such that the air heated in the region of the cooling surface element can flow past the housing and, in the process, the heat output by the lamp by convection can be dissipated to the ambient air via the cooler and pass the block-shaped housing containing the temperature-sensitive electrical and/or electronic components.

U.S. Pat. No. 5,515,254 A discloses a color mixing projector having a housing that is arranged movably in a projector bow-type handle. An illuminant and a cooling device are arranged in a first section of the housing, while a second housing section contains movable color filters and a lens cover. The cooling device comprises a number of contoured, external cooling ribs that are incorporated into the first housing section, which consists of aluminum casting, and have an approximately ellipsoidal outer contour in which an elliptical reflector is arranged and surrounds the illuminant. With the aid of an ellipsoidal cutout, the housing surrounds an illuminant, which is inserted into a mount that is surrounded by an annular cutout of the cooling device. Aligned with the contoured, external cooling ribs are internal cooling ribs that are arranged around an inner annular periphery of an annular section and form a relatively large heat-absorbing surface, while the heat is dissipated via additional ventilation openings. The front termination of the first housing section is formed by a plate that keeps the heat output by the illuminant away from the second, front section of the housing.

EP 0 751 339 discloses an illumination device having a paraboloid-shaped reflector, an illuminant arrangement and a bipartite, tubular front housing in which a front lens is arranged. Provided on the optical axis of the paraboloid-shaped reflector is a central opening for holding the illuminant arrangement, which comprises the illuminant and an illuminant holder made from aluminum casting or ceramic with a number of parallel cooling ribs. The reflector and the front housing consist of an effectively thermally conducting material such as aluminum. The convex rear side of the reflector has a number of parallel cooling ribs that are integrally formed in one piece on the reflector and dissipate the heat output by the illuminant to the surroundings by convection cooling. The illuminant holder, the illuminant, the reflector and the cooling device form a part of the projector housing, the cooling ribs being integrally formed on the outside of the reflector.

SUMMARY

It is an object of the present invention to specify a cooling system for a projector of the type mentioned at the beginning, which cooling system dissipates the heat output by an illuminant from the projector housing in a fashion free from noise and as effective as possible, and protects components located in the interior of the projector housing against the thermal radiation, and/or effectively cools them.

The inventive solution provides a cooling system for a projector that dissipates from the projector housing the heat output by the lamp or a burner, doing so free from noise and with maximum effect, and protects components located in the interior of the projector housing against the thermal radiation and/or cools them.

The inventive solution is based on the consideration of dissipating from the projector the heat output via the three abovenamed processes by the illuminant designed as a lamp or burner, doing so with the greatest possible efficiency, by virtue of the fact that the convective cooling device partially encloses the illuminant and produces a convection flow that directly dissipates the heat output by the illuminant, such that the cooling system is at least partially decoupled from the projector housing, and in this case enables a greater degree of the freedom in fashioning the projector housing and the accommodation of components of the projector, the thermal radiation output by the illuminant is shielded against endangered or heat-sensitive components such as, for example, the lamp cables of the convective cooling device, components located in the interior of the projector housing that cannot be protected against the thermal radiation such as, for example, the reflector, or in relation to which direct thermal conduction takes place such as, for example, the illuminant base, are optimally cooled by an optimized coupling to the convective cooling device, and a maximum convection flow is produced irrespective of the position of the projector, and is fully effective even with the projector being operated at a slant.

Consequently, in contradistinction to the cooling systems known from the prior art, in the case of which the thermal radiation output by the illuminant of the projector is dissipated by intensified feeding of cooling air through convection owing to the arrangement of cooling fins and cooling shafts on the projector housing, according to the invention the heat is absorbed at the location of the heat source, specifically directly at the illuminant itself, and is dissipated from the projector with maximum possible effect such that components located in the interior of the projector housing and, in particular, heat-sensitive components are either protected completely or are protected against overheating by optimum cooling.

The convective cooling device preferably produces a substantially fast, laminar air flow that dissipates the heat output by the illuminant from the projector as quickly as possible and with the greatest possible efficiency, the convective cooling device partially enclosing the illuminant also supporting the quick, laminar flow of air and preserving it efficiently whenever the projector is operated at a slant. The cooling fins of the convective cooling device can optionally be aligned parallel to one another in the direction of gravity, that is to say perpendicularly inside the projector housing, or be inclined to one another, particularly given asymmetric heating, in such a way that a substantially laminar cooling air flow is maintained in all gaps formed between the cooling fins.

Eddying of the heated air emerging from the cooling fins is kept slight by cooling fins of different length, the inner cooling fins especially being longer than the outer cooling fins. Alternatively, or in addition to the cooling fins of different length, the cooling fins can also be bent away outward at their end outputting heat such that the occurrence of eddies impeding the convective air flow is substantially reduced.

The cooling fins exemplary extend over the entire height of the projector and thereby enable the cooling system to be separated as far as possible from the interior of the projector housing.

An exemplary development of the invention is characterized in that the cooling fins are arranged above and below the illuminant in the direction of gravity in a fashion combined into cooling fin packs.

Owing to the design of cooling fin packs with a number of cooling fins arranged parallel or inclined to one another, on the one hand cooling air is guided to the heat source in a targeted fashion, and on the other hand the heated air output by the heat source is dissipated in the cooling fin pack located above the heat source to the outside of the projector housing, the heated air flowing in substantially laminar fashion along the cooling fins and not forming eddies until exiting from the cooling fin pack, such that the thermal load is dissipated with the greatest possible effect and in the shortest time.

The gap thickness of the gaps formed between the cooling fins is exemplary determined at least as a function of the wall temperature of the cooling fins and the height of the cooling fin packs.

During heat transport inside the cooling fin packs, the circulating air flow is in contact with the heated surface of the cooling fins such that the more or less thin layer of air located thereabove is heated by molecular thermal conduction, expands in the process and experiences lift. The effect of this lift is to accelerate the heated air packets upward against the force of gravity until the friction forces at the wall of the cooling fins and in the interior of the flow, on the one hand, and the lift forces, on the other hand, hold the balance in the natural convection flow thus produced. Consequently, an optimal cooling effect by a natural convection requires the friction forces to remain as small as possible so that the inflow of fresh, that is to say cool air, at the walls of the cooling fins is only slightly impeded. A cooling thermal flux can be determined for different wall temperatures of the cooling fins from this thermodynamic process as a function of the gap thickness for different shaft heights of the cooling fin packs. An optimum spacing of the cooling fins for best possible cooling in conjunction with a minimum overall space for the cooling fin packs can be determined from the curves thus ascertained for the thermal flux over the gap thickness or shaft height of the cooling fin packs.

In an exemplary refinement of the invention, the cooling fin packs are delimited by bilateral side plates to form a convective cooling box, that accommodates the lamp holder in the interspace formed between the upper and lower cooling fin packs.

Owing to the partial inclusion of the illuminant outputting heat in the convective cooling box, on the one hand the heat output via the illuminant is optimally dissipated by an optimized laminar convection flow, and the side plates prevent thermal radiation from heating the interior of the projector housing in the space to which the optimized laminar air flow is not applied, and can output the absorbed heat only via secondary emission via the projector housing.

The design of a convective cooling box partially enclosing the illuminant raises the efficiency of the convective air flow produced and restricts the dissipation of the heat output by the illuminant substantially to the convective cooling box such that the dimensioning and shaping of the projector housing is no longer substantially determined by design features for dissipating the heat output by the illuminant. In addition to a smaller overall size of the projector housing, this enables larger degrees of freedom in shaping the projector housing, and additionally offers the possibility of displacing heat-endangered components of the projector into the interior of the projector housing.

The convective cooling box is exemplary not substantially wider than the illuminant itself, and so either the projector housing can be designed to be narrower than conventional projector housings in the end of the projector housing opposite the direction of radiation of the projector, or the interior of the projector housing which, owing to the arrangement of the convective cooling box, heats up substantially less than the interior of conventional, fully ventilated projectors, can be used to accommodate and arrange cables, electronic components, or other heat-sensitive components.

In order to shield the scattered light emitted by the illuminant, and as protection against spray water, the upper cooling fin pack or the convective cooling box is guided out of the upper part of the projector housing and covered by a cover plate that has angled-away ends directed toward the projector housing.

In the design of a convective cooling box, the lamp holder exemplary has upper and lower comb-shaped configurations or slots in which at least a portion of the cooling fins engages with freedom of movement.

This measures ensures optimum heat transfer from the lamp holder to the cooling fins or the convective cooling box without the possibility of thermal stresses occurring between the lamp holder and the cooling fins or the cooling box and being able to lead to damage to the lamp holder or the cooling fins.

For the purpose of optimum cooling of the reflector, which is particularly exposed to the thermal radiation of the illuminant, and of attaining a better cooling action even with the projector at a slant, the front edges of the cooling fins in the radiating direction of the projector are adapted to the shape of the reflector, and substantially cover the reflector, the front edges of the cooling fins either bearing against the reflector or being fastened on the reflector.

For the purpose of further optimization of heat transfer from the reflector to the cooling fins or to the convective cooling box, the rear side of the reflector can be provided with cooling fins that engage in the shape of a comb in the gaps formed between the cooling fins of the convective cooling box. Consequently, an optimum heat transfer is also ensured whenever the reflector is moved relative to the cooling box, or the cooling box is moved relative to the reflector together with the illuminant partially arranged in the cooling box.

A further relief of the reflector from the thermal radiation emitted by the illuminant is attained according to a further feature of the invention by virtue of the fact that the reflector has ventilation openings that open into the gaps formed between the cooling fins.

This further exemplary refinement of the invention proves to be particularly advantageous in conjunction with facet reflectors, since the latter effect diffuse light scattering such that the removal of individual facets or parts of individual facets does not affect the light distribution and has only minimal effects on the quantity of light emitted by the projector.

In one exemplary variant of the cooling system for a projector, it is possible to provide in the reflector a cutout formed by virtue of the fact that an annular region, comprising one or more rows of facets, or a sector-shaped region comprising one or more columns of facets, of the reflector is left free. It is, for example, possible for a cooling air flow to flow into the reflector and through the reflector through a cutout thus created.

In order to reduce the light losses effected by the cutout, the annular and/or column-shaped cutout is covered in this case by a section that is spaced apart radially, formed from reflecting facets and, when viewed from a possible lamp position on the reflector axis, completely covers the cutout and extends approximately parallel to the surface of the reflector. In particular, the section for covering the cutout can be formed by a ring and/or sector whose dimensions are enlarged relative to the region cut out in the reflector, the ring and/or the sector being created in this case by facets such that, when viewed from the reflector axis, it is arranged upstream or downstream of the actual surface of the reflector. This creates an interruption in the reflector for the intrusion of the cooling flow in conjunction with a reflector arrangement that, at the same time, is virtually optically unchanged, and so the light losses effected by the cutout are minimized.

By changing the design of the facets that form the radially spaced apart, for example annular or column-shaped section for covering the cutout with particular regard to the surface shaping and the arrangement, it is possible in this case to arrange that the light distribution of the reflector provided with the cutout is not changed by comparison with the reflector without cutout such that the reflector arrangement produces the desired light distribution.

In a further exemplary refinement of the inventive solution, a heat dissipating plate is arranged between the glass vessel and the contact pins of the illuminant and is aligned with the cooling shafts of the cooling fin packs.

This further exemplary refinement of the inventive solution improves the shielding of endangered components such as the electrical contacts and electrical lines before the thermal radiation output by the illuminant, the heated air being led off upward or downward from the lamp holder into the cooling fin packs or into the cooling shafts formed between the cooling fins, even when the projector is slanted.

For the purpose of optimized heat dissipation even in the case of a slanted projector, the heat dissipating plate is of V-, U- or S-shaped design and, in a further refinement of the inventive solution, can be connected directly to the illuminant base.

Alternatively, the heat dissipating plate can be connected to the lamp holder, in particular to the lamp clamp. It is essential here that the heat dissipating plate bears against the lamp neck as positively as possible, in order to block off the flow of the hot air rearward, that is to say against the radiating direction of the projector.

The inventive solution is suitable, in particular, for projectors in which the cylindrical illuminant is aligned in the axial direction of the projector and is inserted into a central opening of the reflector. In the case of this axial optical system, the light-emitting glass cylinder of the illuminant is located inside the reflector, while the lamp base is mounted by the convective cooling device, that is to say by the cooling fins, the cooling fin packs or the convective cooling box, and the front edges, adapted to the contour of the reflector, of the cooling fins are laid against the rear side of the reflector for the purpose of optimum heat transmission. The highest possible effectiveness is thereby ensured in removing the thermal load resulting from the illuminant, even given an axial displacement of the illuminant in order to prevent the radiation angle.

Alternatively, the illuminant can be aligned in the direction of gravity (vertically), and the cooling fin packs or the convective cooling box can bear against the reflector or be connected to the reflector, or the illuminant can be aligned transverse to the direction of gravity (horizontally) and be arranged in a cutout of the reflector, while the cooling fin packs or the convective cooling box bear/bears against the reflector or are/is connected to the reflector.

BRIEF DESCRIPTION OF THE DRAWINGS

It is intended to use an exemplary embodiment illustrated in the drawing in order to explain in more detail the idea on which the inventive is based, and further features and advantages of the invention.

FIG. 7 shows a schematic illustration of a reflector having an annular cutout.

FIG. 8 shows a schematic illustration of a reflector having an annular cutout.

FIG. 9 shows a schematic illustration of a reflector having a sector-shaped cutout.

FIG. 10 shows a schematic illustration of a reflector having a sector-shaped cutout.

DETAILED DESCRIPTION

Figure 1:
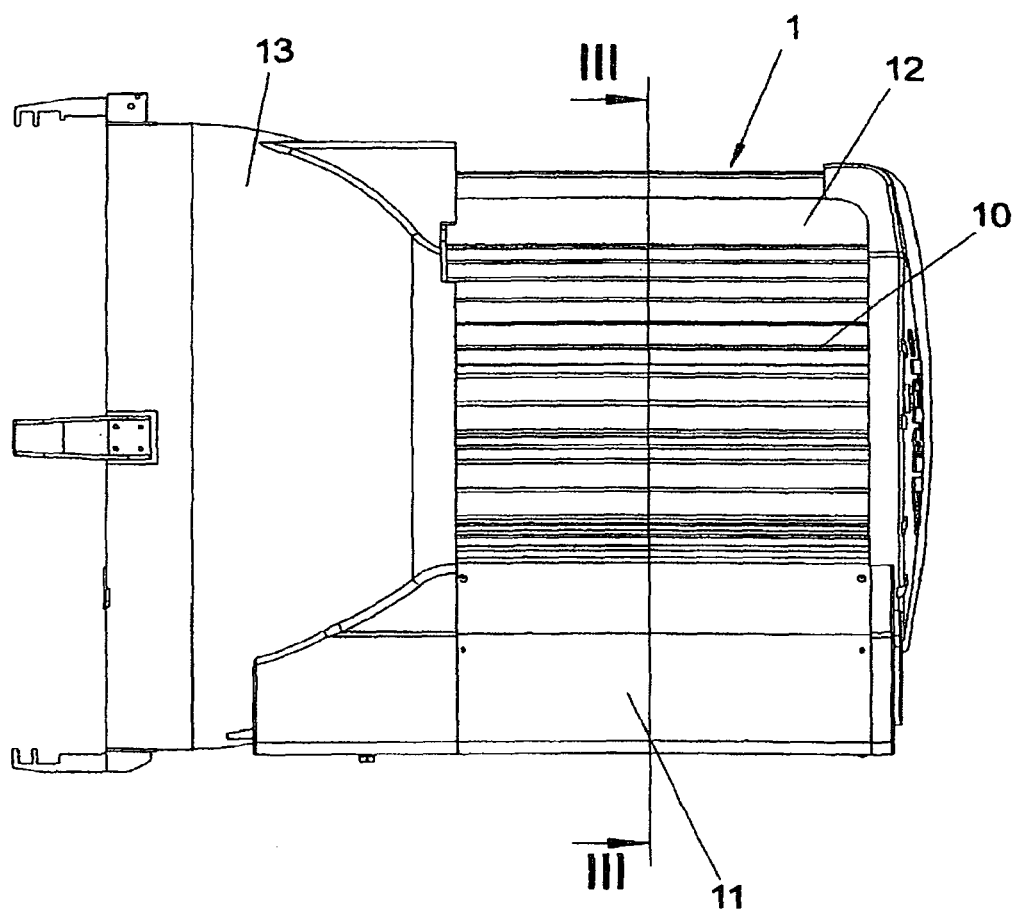
FIG. 1 shows a side view of a compact projector having a convective cooling device.
Figure 2:
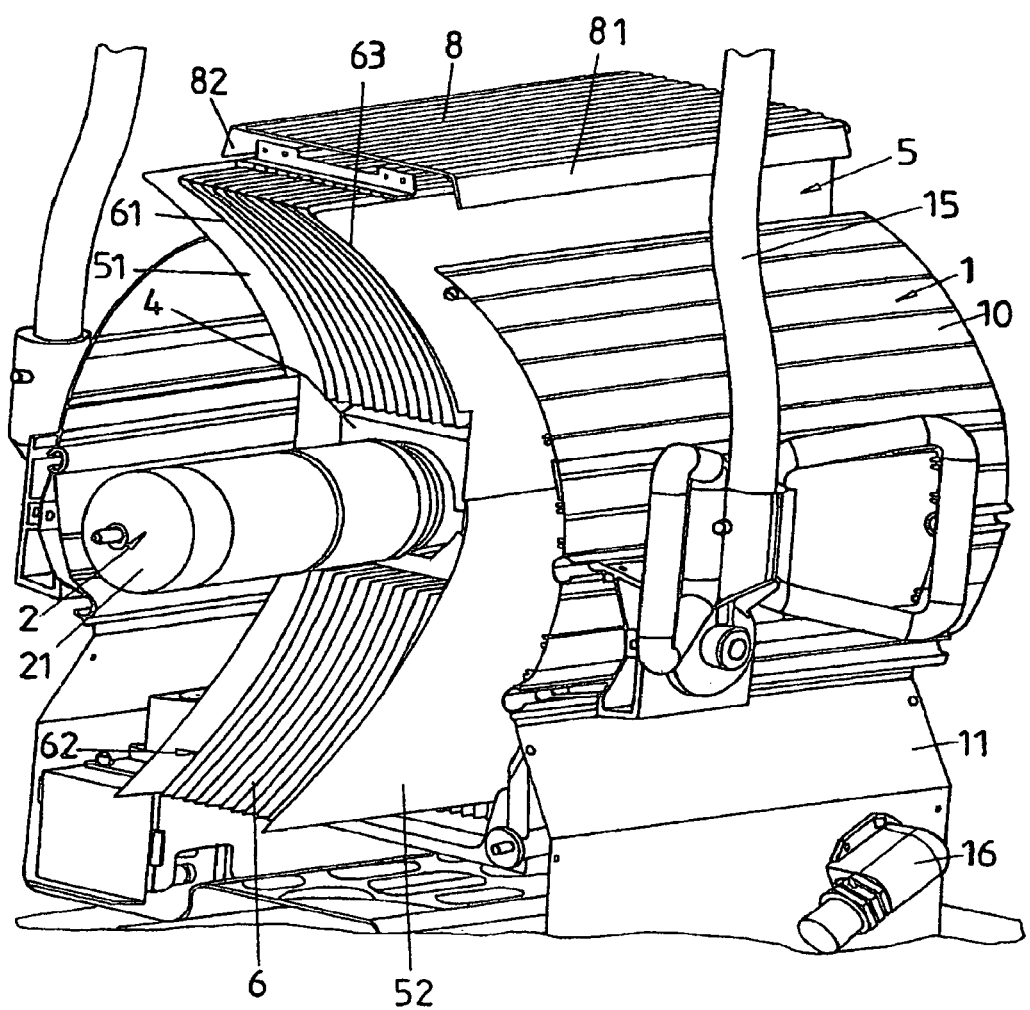
FIG. 2 shows, partially in section, a perspective view of the projector in accordance with FIG. 1.
Figure 3:
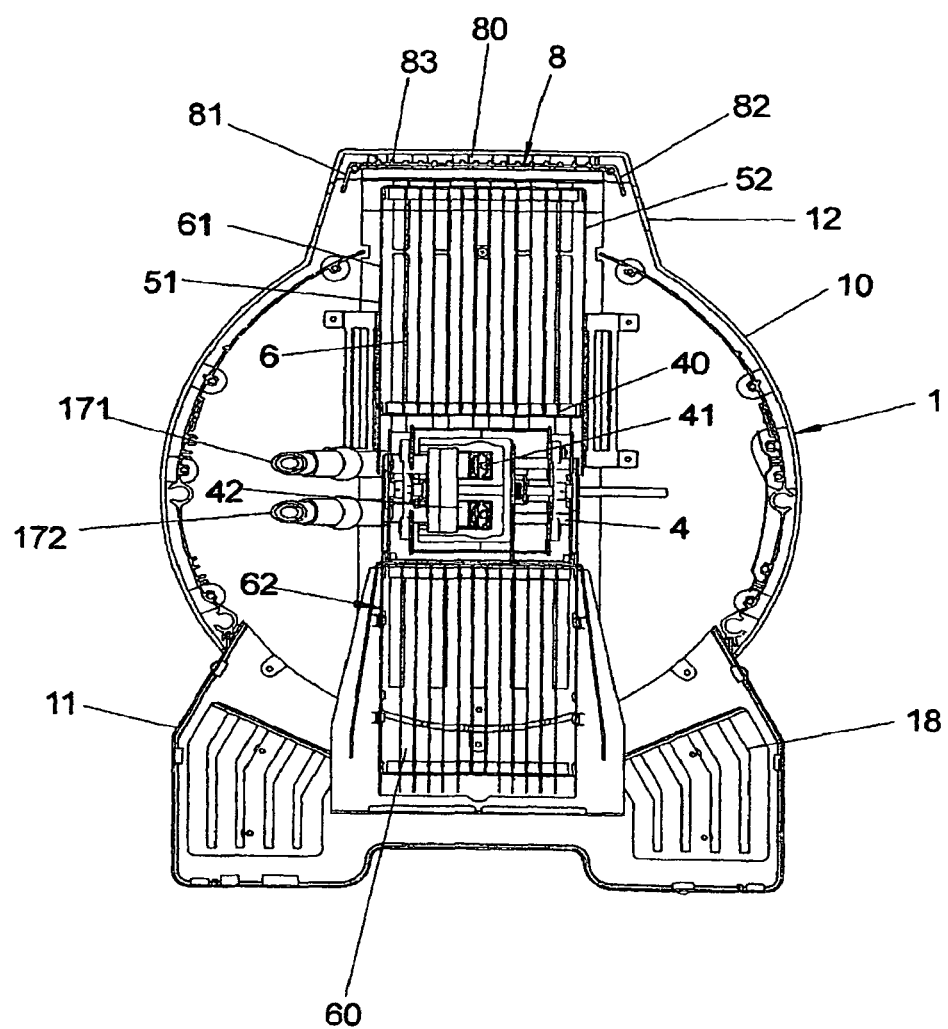
FIG. 3 shows a section through the projector in accordance with FIGS. 1 and 2 along the line of section III-III.
Figure 4:
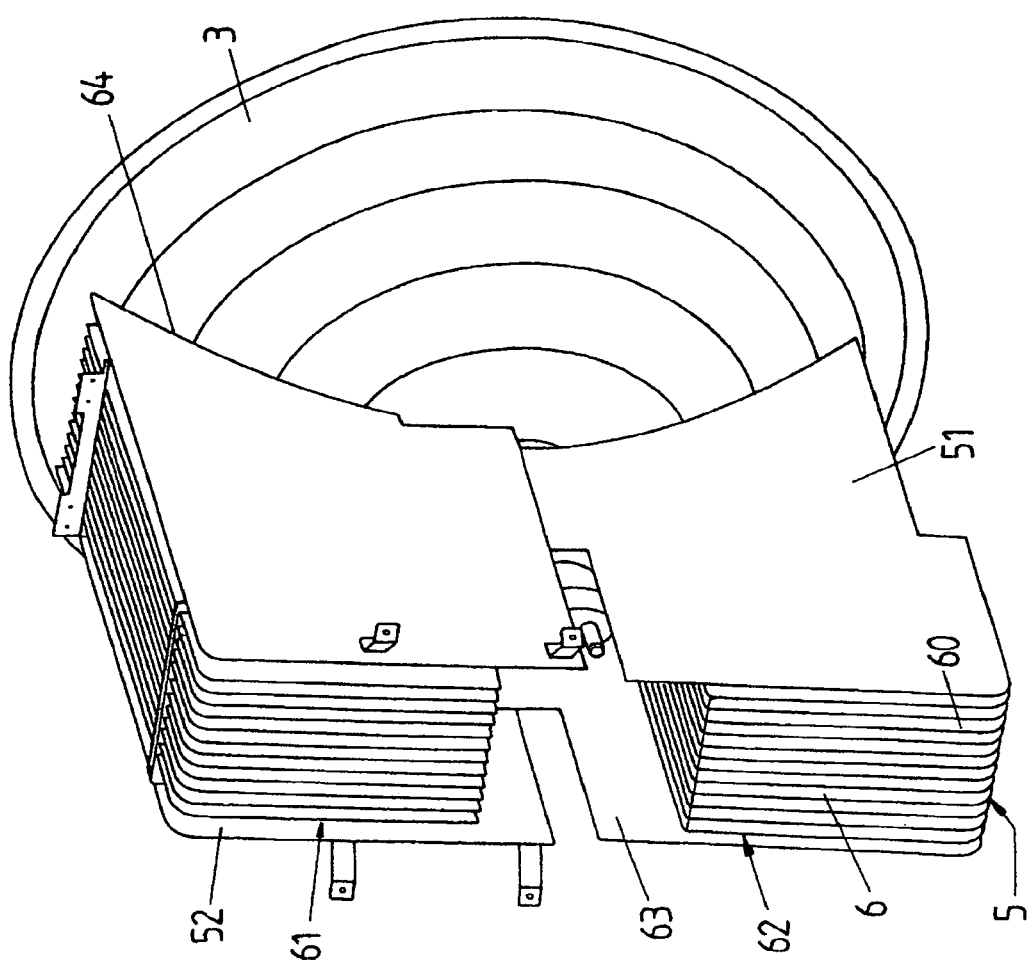
FIG. 4 shows a perspective partial view of a convective cooling box and reflector of the projector in accordance with FIGS. 1 to 3.
Figure 6:
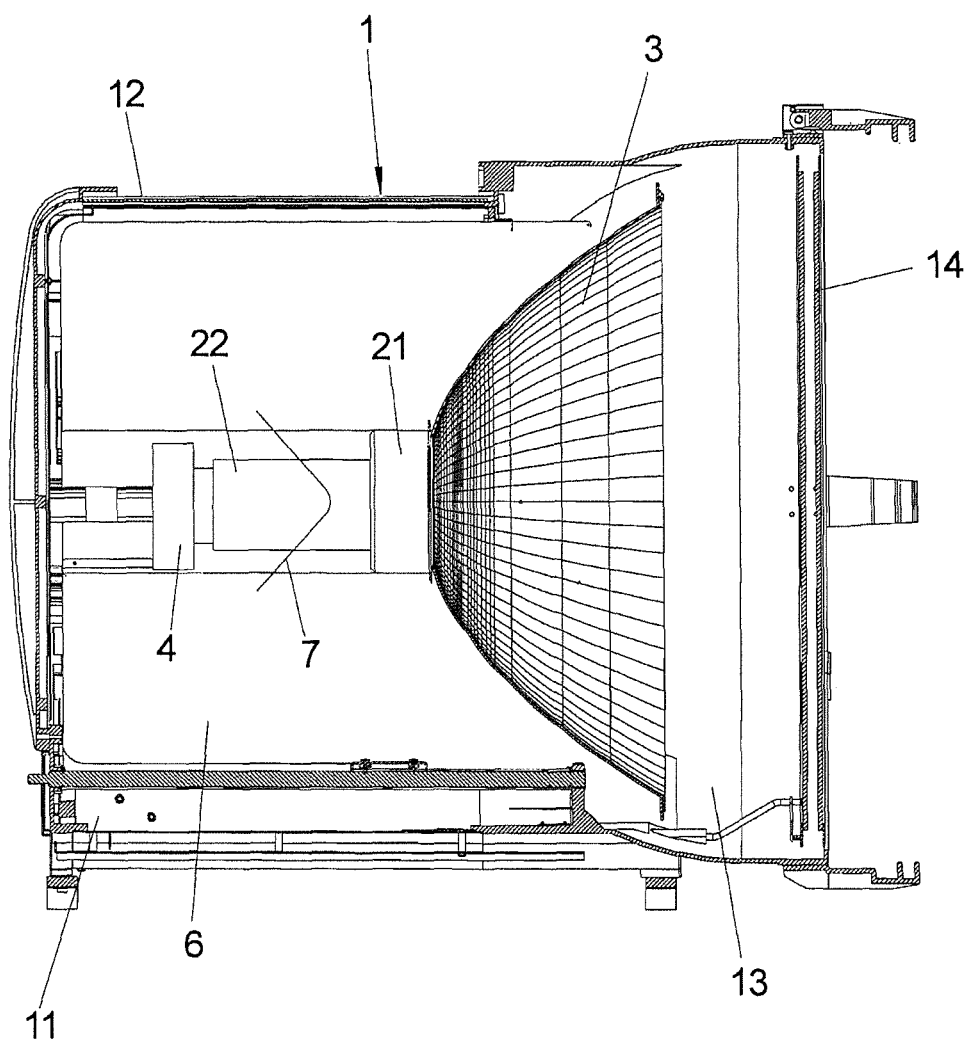
FIG. 6 shows a longitudinal section through the projector in accordance with FIG. 1.

The side view illustrated in FIG. 1, the perspective view, in partial section, in accordance with FIG. 2, the cross section through the projector in accordance with FIG. 3 and the longitudinal section through the projector in accordance with FIG. 6 show a projector housing 1 having a central, cylindrical lamp housing 10 of the projector housing 1, a lower, polygonal functional housing 11, an upper part 12 projecting in the shape of a trapezoid from the cylindrical lamp housing 10, and a front part 13 adapted to the contour of the reflector 3 illustrated in FIG. 6.

As is to be gathered, in particular, from the side view in accordance with FIG. 1 and the perspective view, cut in section, in accordance with FIG. 2, it is possible in the case of the reflector housing 1 to dispense with the otherwise customary pronounced finning, in particular of the cylindrical lamp housing 10, in order to enlarge the surface outputting heat, since the inventive convective cooling device specifically dissipates the heat output by the lamp 2, in particular via the glass vessel 21 therefor, to the upper, trapezoidal part 12 of the projector housing 1 in order to produce a convection flow, and thereby protects the components located in the interior of the projector housing 1 against a strong thermal loading.

In accordance with FIG. 6, the light-emitting front side of the projector housing 1 is closed by a cover element in the form of a glass disk or a lens disk. A projector bow-type handle 15 connected to the cylindrical lamp housing 10 serves the purpose of transporting as well as fastening the stand or suspending the projector, and can be adjusted axially on the lamp housing 10 in order to displace the centroid.

During operation of the projector, the burning lamp 2 produces in its arc or in its filament heat that is partially absorbed as thermal radiation by the surrounding components, in particular by the reflector 3, the projector housing 1 and the front cover disk or cover lens 14, and this leads to a substantial loading of these components, which consist of materials that can be subjected to thermal loading, and must be appropriately dimensioned. However, these components also act as secondary heat source that, for its part, outputs heat to the surroundings or to further components, particularly in the interior of the projector, such that it is necessary, for example, to provide finning of the projector housing 1 in order to make available a sufficiently large surface outputting heat.

Furthermore, direct thermal conduction takes place via the contact connectors 41, 42 and supply leads 171, 172 as well as via the ceramic body of the lamp base 22.

Finally, the heat output by the burning lamp 2 results in the ambient air of the lamp 2 being heated up and in the heated air rising upward against the direction of gravity and entraining cooler air from below. The provision of support for this convection flow requires the provision of appropriately dimensioned air inlets on the underside of the projector, and the formation of air exit openings on the top side of the projector, in order to be able to output the heated air to the surroundings. In this case, it is to be ensured by shaping the air entrance and air exit slots that no wandering light exits from the projector housing 1.

Because of the above reasons, the projector housings designed according to the prior art are dimensioned to be large with reference to the projector power in order to be able to absorb the thermal loads emanating from the burning lamp, and have their outer surface strongly profiled in order to configure the heat-outputting surface to be sufficiently large, and to ensure a sufficiently large convection flow without light exiting from the projector housing.

By contrast, in the case of the inventive cooling system for projectors there is targeted thermal conduction of the heat output by the burning lamp 2 in the case of which the thermal radiation onto endangered components such as, for example, in accordance with FIGS. 2 and 3 the lamp cables 171, 172 and contact connectors 41, 42, into which contact pins on the lamp base 22 (FIGS. 5 and 6) of the lamp 2 are plugged, is shielded by a heat dissipating plate 7, and components that cannot be protected against thermal radiation such as, for example, the reflector 3, or to which heat is conducted directly such as, for example, to the lamp holder 4, are cooled by optimized coupling to heat-dissipating components. Furthermore, the convection process is optimized by a convective cooling device such that a fast, laminar air flow is produced that is effective even when the projector is, for example, operated at a slant.

To this end, the inventive cooling system in accordance with FIGS. 2 to 6 has a convective cooling box 5 that comprises a number of plate-shaped cooling fins 6, arranged parallel to one another and aligned in the direction of gravity, and two side plates 51, 52. The cooling fins 6 are combined to form an upper and a lower cooling fin pack 61, 62 and enclose therebetween a part of the lamp 2, in particular the lamp base 22 or the lamp holder 4 holding the lamp base 22. Gaps 60 are formed between the individual cooling fins 6 such that there are formed between two cooling fins 6 in each case cooling shafts via which cool air is brought up from the lower cooling fin pack 62, and heated air is led off from the upper cooling fin pack 61.

The cooling shafts formed between the cooling fins 6 are dimensioned so as to ensure an optimum, fast, laminar air flow for dissipating the heat produced by the lamp 2. The dependence of the thermal flux per shaft width can be determined by experiments as a function of the width of the gap 60 between the individual cooling fins 6 with different shaft heights as parameter, and the dependence of the thermal flux per shaft width can be determined as a function of the shaft height with different shaft thicknesses as parameter given different wall temperatures of the cooling fins 6, and be plotted as a curve.

It follows from this that scarcely any cooling action comes about for excessively small gap thicknesses, because by comparison with the lifting forces the friction is extensively large because of the unfavorable ratio of surface to volume. With increasing gap thickness, the cooling action firstly rises steeply and finally approaches a constant value asymptotically, since air packets that lie too far away from the heated surface cannot be heated in any case and therefore do not participate in the convection flow.

When determining an optimum spacing of the cooling fins 6 for given dimensions of the projector housing 1, it is to be considered that although in the case of a small gap thickness it is possible to accommodate more cooling fins 6 in the projector housing 1, their effect decreases over-proportionately, however, while overall space is given away with too large a spacing. The respective optima are to be found in the abovenamed curves where the tangents passing through the origin of coordinates touch the curves.

Taking account of the heat output by the lamp 2, the ambient temperature and the available overall space, it is therefore possible to determine an optimum dimensioning of the cooling fins 6 and/or the cooling fin packs 61, 62, and thus of the convective cooling box 5. This results in an optimum gap thickness of 8 mm, for example, given a wall temperature of 200 degrees C. and a shaft height, formed between the cooling fins 6, of 0.5 m.

In accordance with FIGS. 2 and 3, the heat output by the lamp 2 is guided via the upper cooling fin pack 61 and output in the region of the upper, trapezoidal part 12 of the projector housing 1 in which there is arranged a cover plate 8 that has ends 81, 82, which are bent downward laterally, and a finned outer surface 80, and which effects an optimum distribution of heat in the upper, trapezoidal part 12 of the projector housing 1.

As an alternative to a parallel arrangement of the cooling fins 6, the cooling fins can also be inclined to one another such that an optimum cooling flow is set up even when the cooling fins 6 are heated asymmetrically.

In order as far as possible to suppress eddying when the heated air exits at the upper end of the cooling fins 6 under the cover plate 8, the cooling fins 6 of the convective cooling box 5 can be dimensioned with different length such that, for example, the inner cooling fins 6 are longer than the outer ones and so the heated air exiting from the upper ends of the cooling fins 6 can more easily escape laterally.

For this reason, the cooling fins 6 can also be bent upward at their upper end, and thus support the lateral removal of the heated air.

As is to be gathered, in particular, from the cross-sectional illustration in accordance with FIG. 3, the cooling fins 6 extend over the entire height of the projector and therefore enable an optimum convective air flow and blocking off of the cooling system from the interior of the projector housing 1 to the greatest possible extent. Consequently, the remaining interior space of the projector housing 1 is relieved of the thermal radiation to the greatest possible extent such that greater latitude is provided for configuring the projector housing 1, and it becomes possible to accommodate in the interior of the projector housing 1 heat-sensitive components such as cables, electronic components and the like.

In order to transfer heat optimally from the lamp holder 4 to the upper and lower cooling fin packs 61, 62, in accordance with FIG. 3 the lamp holder 4 has comb-like cutouts or slots 40 into which the cooling fins 6 engage with play such that no kind of thermal stresses can occur between the cooling fins 6 and the lamp holder 4. These comb-shaped configurations serve the purpose of better thermal transfer into the cooling fins 6 without thermal stresses being able to occur between the lamp holder 4 and the cooling fins 6 or the convective cooling box 5 and result in damage to the lamp holder 4 and/or the cooling fins 6.

In order to protect the reflector 3 in accordance with FIGS. 2 and 4 to 6, the front edges 64, in the radiating direction of the projector, of the cooling fins 6 have a shape adapted to the contour of the reflector 3. This adaptation of the front edges 64 of the cooling fins 6 to the contour of the reflector 3 effects a good heat transfer from the reflector 3 to the convective cooling box 5, it being optionally possible for the cooling fins 6 to bear loosely against the outer wall of the reflector 3 or to be fastened on the reflector 3 in order in this way to optimize the thermal transfer from the reflector 3 onto the cooling fins 6 and thus onto the convective cooling box 5.

A further advantage of the adaptation of the front edges 64 of the cooling fins 6 to the contour of the reflector 3 consists in that good thermal transfer from the reflector 3 onto the cooling fins 6 and thus onto the convective cooling box 5 is ensured even when the projector is operated at a slant.

Cooling fins additionally fitted on the reflector 3 that engage like a comb in the cooling fins 6 of the convective cooling box ensure good thermal transfer from the reflector 3 to the convective cooling box 5 even when, for the purpose of varying the radiation characteristic of the projector, relative movement is provided between the reflector 3 and the illuminant 2, and thus the convective cooling box 5 partially surrounding the illuminant 2.

For the purpose of better dissipation of the heat occurring on the front side of the reflector 3 in the region between the reflector 3 and the front cover disk 14, it is possible to provide in the reflector surface cutouts that open into the gaps formed between the cooling fins 6 such that a thermal flux is produced from the front structural space of the projector to the convective cooling box 5, and thus the loading both of the reflector 3 and of the front cover disk 14 or of the front part 13 of the projector housing is reduced. This additional convective flow presents itself, in particular, when use is made of so-called "facet reflectors" whose light-reflecting surface is formed from a multiplicity of individual facets. Openings for heat dissipation can be produced by omitting individual facets or parts of individual facets, without this resulting in a marked deterioration in the quantity of light emitted by the projector.

Cutouts 36 in the case of which entire rows or columns of facets 33 of the reflector 3 are left free are provided for optimizing the cooling in the case of the embodiments of the reflector 3 illustrated in FIGS. 7 to 10.

Illustrated in FIGS. 7 and 8 is a reflector in which an annular cutout 36 in the surface of the reflector 3 is covered by a ring 35b' of facets 33, the ring 35b' being formed from a number of facet rows, having an enlarged diameter and a greater height than the reflector 3 in the region of the cutout 36, and therefore being arranged downstream of the actual reflector 3 when viewed from the reflector axis. There is provided in this way a reflector arrangement having a cutout 36 in which, for example, a cooling air current can penetrate into the interior of the reflector 3 and through the reflector 3 while, at the same time, the optical behavior of the reflector 3 is not impaired.

The ring 35b' serving to cover the cutout 36 is in this case spaced apart radially from the actual reflector 3, extends substantially parallel to the original surface of the reflector 3 in the region of the cutout 36, and overlaps the respectively neighboring rings 35a, 35c in the direction of the reflector axis in order thereby to cover the cutout 36 completely when viewed from the reflector axis, in particular from the possible lamp positions on the reflector axis. In this way, the losses that arise from light scattered from the cutout 36 in the reflector 3 can be reduced such that the efficiency and the light distribution produced for the reflector 3 provided with cutouts 36 in the way described are not substantially influenced, whereas the cooling action is, however, substantially increased as compared with taking out individual facets 33.

A cutout 36 for a cooling current is provided in the reflector 3 illustrated in FIGS. 9 and 10 by leaving free a sector-shaped region of facets 33 of the reflector 3, and is covered by a radially spaced-apart sector 34' arranged downstream of the actual reflector 3 when seen from the reflector axis. The sector 34' is formed by a number of columns of facets 33 and extends substantially parallel to the original surface of the reflector 3 in the region of its cutout 36. It is clear from FIG. 9 that the sector 34' firstly has its height increased along the reflector axis and in a radial direction increased perpendicular to the reflector axis, and secondly is arranged, when seen from the reflector axis, in a fashion offset outward, that is to say in a radial direction relative to the actual reflector 3. The sector 34' can in this case additionally be designed in a fashion perpendicular to the reflector axis along the circumference of the reflector 3 such that it overlaps the sectors neighboring the sector 34' in a circumferential direction.

A reflector 3 in accordance with FIGS. 7 to 10 therefore has a cutout 36 by means of which an effective cooling of the reflector 3 and the lamp 2, which is arranged in the interior of the reflector 3 and is enclosed by the latter, is possible, with light power and light distribution of the projector not being substantially impaired by the design and the spatial arrangement of the sector 34', forming a section of the coverage of the cutout 36, or the ring 35b' such that the projector has a comparable efficiency to that of an arrangement having a closed reflector 3.

It may be pointed out here that FIGS. 7 to 10 are not drawn true to scale and, in particular, that the radial spacing between the section 34', 35b' serving for covering and the reflector 3 can be smaller than illustrated.

In the case of the embodiments of the reflector 3 in accordance with FIGS. 7 to 10, it is possible in this case by means of a changed design of the facets 33 with regard to their curvature and their arrangement in the ring 35b' or the sector 34' to arrange that the light distribution produced by the reflector 3 provided with the cutout is comparable to the light distribution in the case of a closed reflector 3.

Moreover, it is conceivable not only to provide one cutout by omitting whole lines or columns of facets 33 of the reflector 3, but to provide a number of cutouts in the reflector 3 by omitting, displacing and/or scaling a number of rings 35b' and/or sectors 34' or facets 33, in order to achieve a further improvement of the cooling.

In addition to the above-described convective cooling device, the inventive cooling system has ventilation shafts 18 in accordance with FIG. 3, which are arranged in the lower, polygonal functional housing 11 and via which cooling air is led into the interior of the projector housing 1, which is formed between the convective cooling box 5 and the cylindrical lamp housing 10. By convection flow, this cooling air guides the heat output by the side plates 51, 52 of the convective cooling box 5 to the upper, trapezoidal part 12 of the projector housing 1, and therefore prevents a build up of heat in this part of the housing interior. In this case, the cooling air passes via air exit openings, arranged outside the projector housing 1, of the ventilation shafts 18 to the light exit openings opening into the interior of the projector housing 1, and via the convective cooling box 5 into the upper, trapezoidal part 12 of the projector housing 1.

Figure 5:
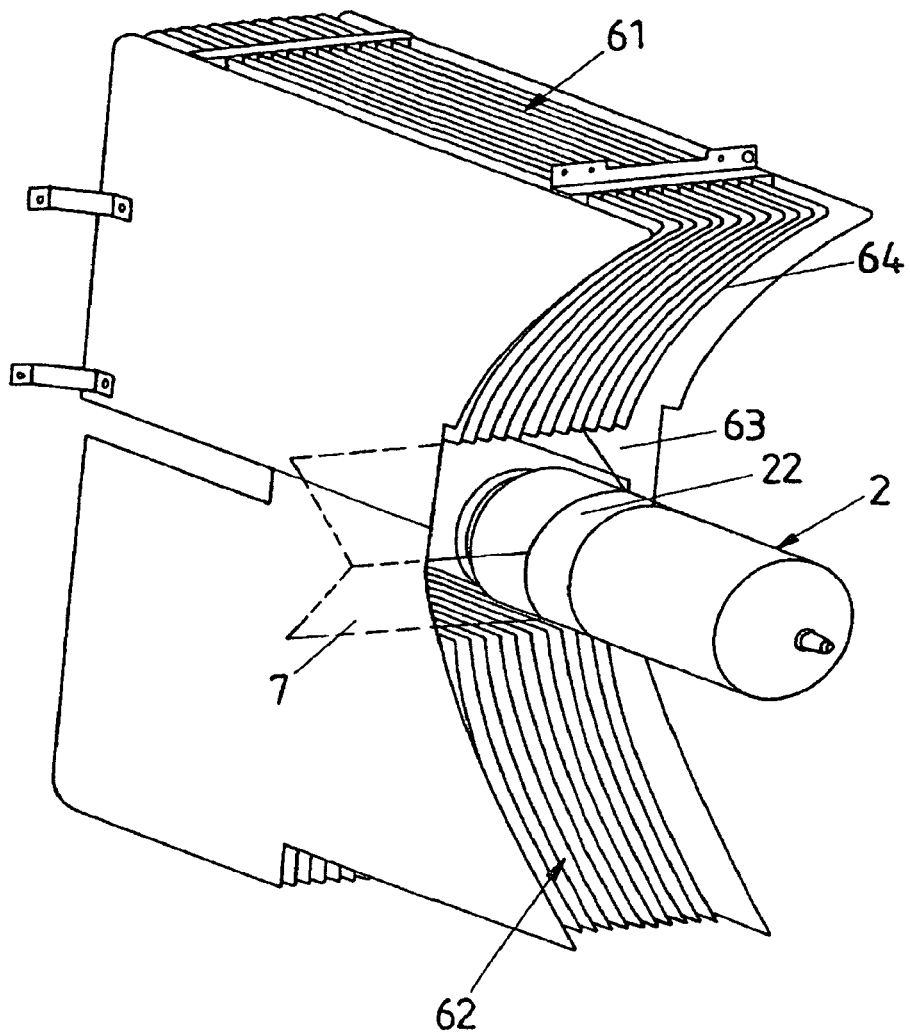
FIG. 5 shows a perspective partial view of an axially aligned lamp partially enclosed in the convective cooling box.

It may be gathered from the perspective illustration in accordance with FIG. 5 how the lamp 22 is enclosed by the convective cooling box 5 in the interspace 63 formed between the upper cooling fin pack 61 and the lower cooling fin pack 62, and is displaceably supported in this interspace 63 on the optical axis of the projector, that is to say in an axial direction. Irrespective of the position of the lamp 2, at least a part of the lamp 2, in particular the lamp base 22, is enclosed by the convective cooling box 5 such that an optimum thermal transfer, and thus quick, laminar air flow is ensured for dissipating heat output by the lamp 2.

In accordance with FIGS. 5 and 6, as further feature of the inventive cooling system for projectors a V-shaped heat dissipating plate 7 is connected to the lamp base 22 and protects the components of the projector that are particularly sensitive to heating, such as the lamp cables 171, 172 guided in the interior of the projector housing 1, and the contact connectors 41, 42 of the lamp holder 4 from excessive heating by virtue of the fact that the heat dissipating plate 7 shields these components against thermal radiation and dissipates the heat led via the lamp base 22 to the outside, in particular to the upper and lower cooling fin packs 61, 62 of the convective cooling box 5.

The connection of the heat dissipating plate 7 to the lamp base 22 is preferably formed by plugging the heat dissipating plate 7, formed as a plug-on part, onto the lamp base 22 or the lamp neck, the heat dissipation plate 7 being designed such that it bears against the lamp neck as positively as possible in order to block off the current of the hot air output by the illuminant 2 in a fashion opposite to the radiating direction of the projector, that is to say rearward.

As an alternative to the connection of the heat dissipating plate 7 to the lamp base 22 or the lamp neck, the heat dissipating plate 7 can also be connected to a separate lamp clamp that is provided for mechanically relieving the contact pins of the illuminant 2 or the contact connector of the projector, and surrounds the lamp base 22 and secures it mechanically.

The above-described exemplary embodiment was explained with the aid of an axially aligned lamp 2 that can be adjusted on the optical axis of the projector, but it is not restricted to this form of the arrangement of a lamp or of a burner. Thus, the inventive cooling system can, of course, also be used in a spherical optical system in which the lamp stands vertically in front of a reflector, or in which use is made of double capped lamps that are installed transverse to the reflector and, if appropriate, lie in a cutout of the reflector. In the case of these variants, as well, the above-described convective cooling device can likewise be used advantageously like the heat dissipating plate.

The invention claimed is:
1. A projector with a projector housing comprising:
an illuminant holder for holding an illuminant,
a reflector that reflects light beams emitted by the illuminant to a light exit opening of the projector housing that is covered by a transparent disk, wherein at least a portion of said illuminant holder extends externally from the reflector in a direction opposite said light exit opening, and a convective cooling device that produces a convective air flow from the bottom to a top of the projector housing for dissipating the heat output by the illuminant, said convective cooling device comprising at least two side plates and two packs of cooling fins, wherein one of said packs of cooling fins is arranged below the illuminant and the other one above the illuminant, wherein said at least two side plates and said cooling fins in each pack of cooling fins are at least substantially aligned in parallel to an optical axis of the projector, wherein an opening is defined between said two packs of cooling fins and between said at least two side plates, said opening being bordered along its perimeter by said two packs of cooling fins and by said at least two side plates, said opening allowing for said convective air flow there-though, wherein at least a part of said illuminant holder and at least a part of said illuminant extend into said opening, wherein the cooling device enables vertical airflow from the bottom to the top of the projector, and wherein the convective cooling device comprises a front facing said reflector and a rear opposite said front, wherein said opening defined between, and bordered along its perimeter by, said two packs of cooling fins and said two side plates opens to said rear.

2. The projector of claim 1, wherein the cooling fins are arranged parallel or inclined to one another.

3. The projector of claim 1, wherein a gap thickness of gaps formed between the cooling fins is determined at least as a function of a wall temperature of the cooling fins and the height of the cooling fin packs.

4. The projector of claim 1, wherein the cooling fins are designed at least partially with different lengths.

5. The projector of claim 1, wherein a top cooling fin pack of the convective cooling device is guided out of the upper part of the projector housing and covered by a cover plate.

6. The projector of claim 1, wherein the illuminant holder has upper and lower comb-shaped configurations or slots in which at least a portion of the cooling fins engage with freedom of movement.

7. The projector of claim 1, wherein said cooling fins comprise front edges and rear edges in the radiating direction of the projector, said front edges being adapted to the shape of the reflector and bearing against the reflector, said rear edges extending beyond the rear end of the reflector.

8. The projector of claim 1, wherein a rear side of the reflector is provided with cooling fins that engage gaps formed between the cooling fins of the convective cooling device.

9. The projector of claim 1, wherein the reflector has ventilation openings that open into gaps formed between the cooling fins.

10. The projector of claim 1, with a facet reflector having a multiplicity of facets arranged annularly in rows and columns around the center of said reflector and forming a reflecting surface, wherein an annular region, comprising one or more rows of facets, of said reflector is left free so as to provide a cutout in the region of said reflector through which a cooling air flow can flow through said reflector.

11. The projector of claim 1, with a facet reflector having a multiplicity of facets arranged annularly in rows and columns around the center of said reflector and forming a reflecting surface, wherein a region, comprising one or more columns of facets, of said reflector is left free so as to provide a cutout in the surface of said reflector through which, a cooling air flow can flow through said reflector.

12. The projector of claim 1, wherein a heat dissipating plate is arranged between a glass vessel of said illuminant and contact pins of said illuminant and is aligned with said packs of cooling fins.

13. The projector of claim 1, wherein the illuminant having a substantially cylindrical contour is aligned in the axial direction of the projector and inserted into a central opening of the reflector.

14. The projector of claim 1, wherein the illuminant is aligned in the direction of gravity, and wherein the packs of cooling fins of the convective cooling device bear against the reflector or are/is connected to the reflector.

15. The projector of claim 1, wherein the illuminant is aligned transverse to the direction of gravity and is arranged in a cutout of the reflector, and wherein the packs of cooling fins or the convective cooling device bear against the reflector or are/is connected to the reflector.

16. The projector of claim 1, wherein said convective cooling device has a number of said cooling fins substantially extending over an entire height of the projector housing, said cooling fins being aligned in parallel to an optical axis of the projector, said cooling fins comprising front edges and rear edges in the radiating direction of the projector, said front edges being adapted to the shape of the reflector and bearing against the reflector, said rear edges extending beyond the rear end of the reflector enclosing a part of the illuminant that protrudes from the rear end of the reflector, said packs of cooling fins being substantially adapted to a width of the illuminant, said packs of cooling fins being delimited by said at least two side plates which extend substantially over an entire height of the projector housing, said packs of cooling fins and said at least two side plates forming a convective cooling box, which accommodates the illuminant holder in an interspace formed between said upper and lower packs of cooling fins and said side plates.

17. The projector of claim 1, wherein each said at least two side plates comprises two sections coupled to each other.

18. The projector of claim 1, wherein the convective cooling device extends from one end of the housing through the housing and to another end of the housing.

19. The projector of claim 7, wherein the cooling fins are fastened on the reflector.

20. The projector of claim 10, wherein the cutout is covered by a section that is formed from reflecting facets, is spaced apart radially from the reflecting surface of said reflector, and extends approximately parallel to the reflecting surface.

21. The projector of claim 11, wherein the cutout is covered by a section that is formed from reflecting facets, is spaced apart radially from the reflecting surface, and extends approximately parallel to the reflecting surface.

22. The projector of claim 20, wherein the section formed for covering the cutout is formed from facets that are fashioned as regards their surface shaping and arrangement such that said reflector produces light distribution.

23. The projector of claim 12, wherein said heat dissipating plate is of V-, U- or S-shaped design.

24. The projector of claim 12, wherein said heat dissipating plate is connected to an illuminant base.

25. The projector of claim 12, wherein said heat dissipating plate is connected to the illuminant holder.

26. The projector of claim 24, wherein said heat dissipating plate is plugged onto said illuminant base.

27. The projector of claim 13, wherein the illuminant and the reflector are displaced in an axial direction relative to one another.

\* \* \* \* \*